April 7, 1925.
H. L. McMILLAN
SEWAGE FLOW REGULATOR
Filed April 29, 1921
1,532,829
3 Sheets-Sheet 1
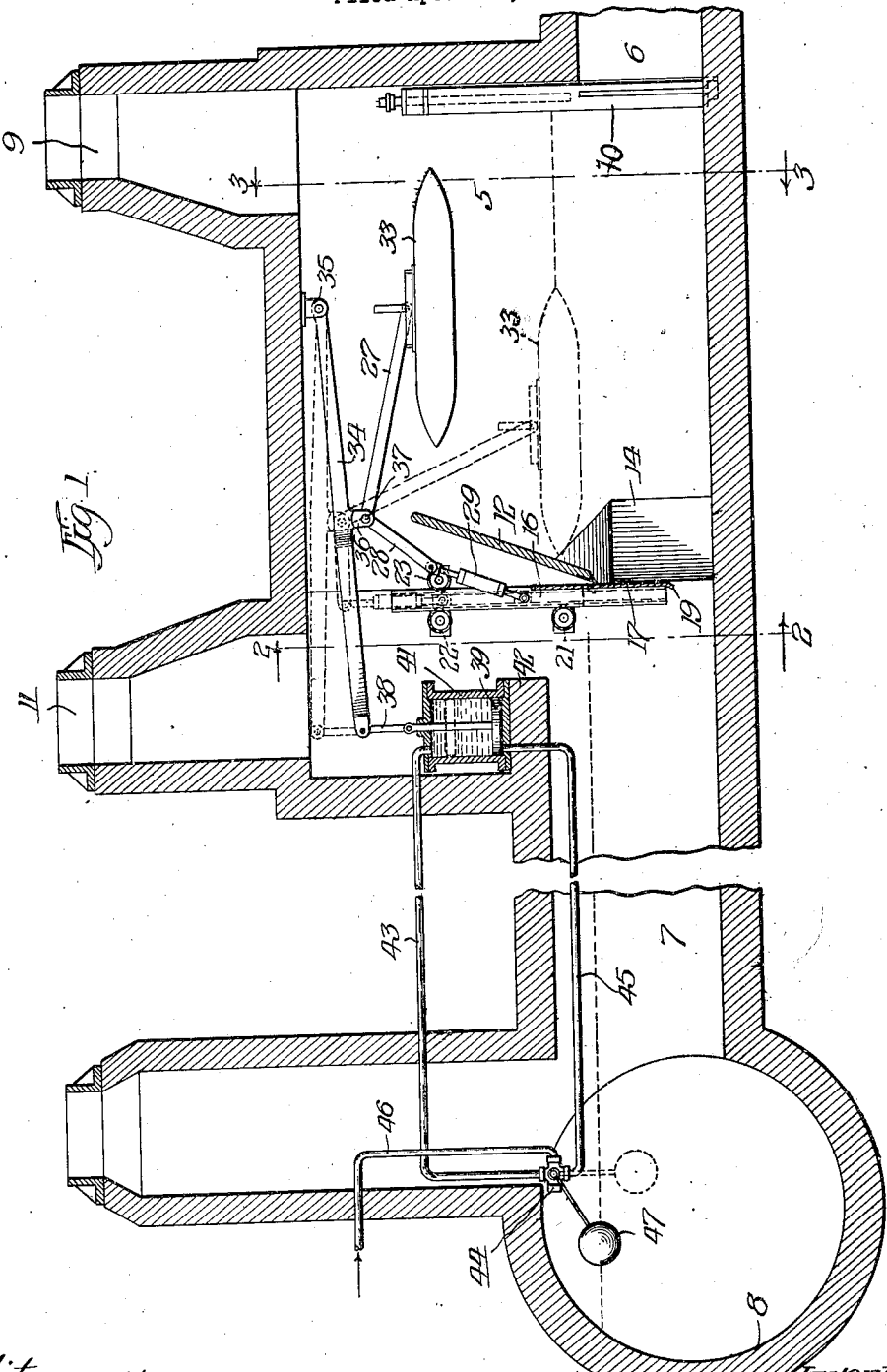

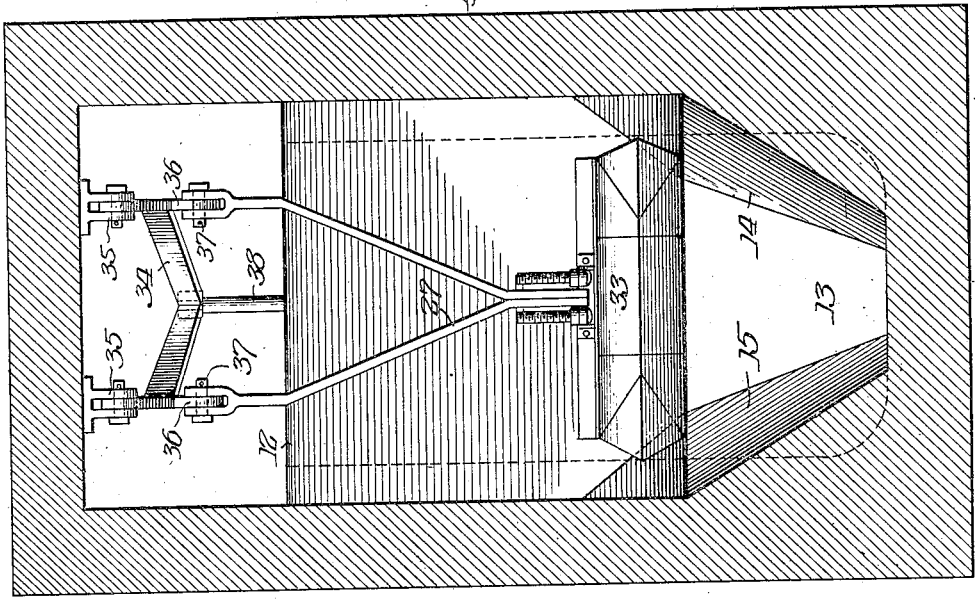

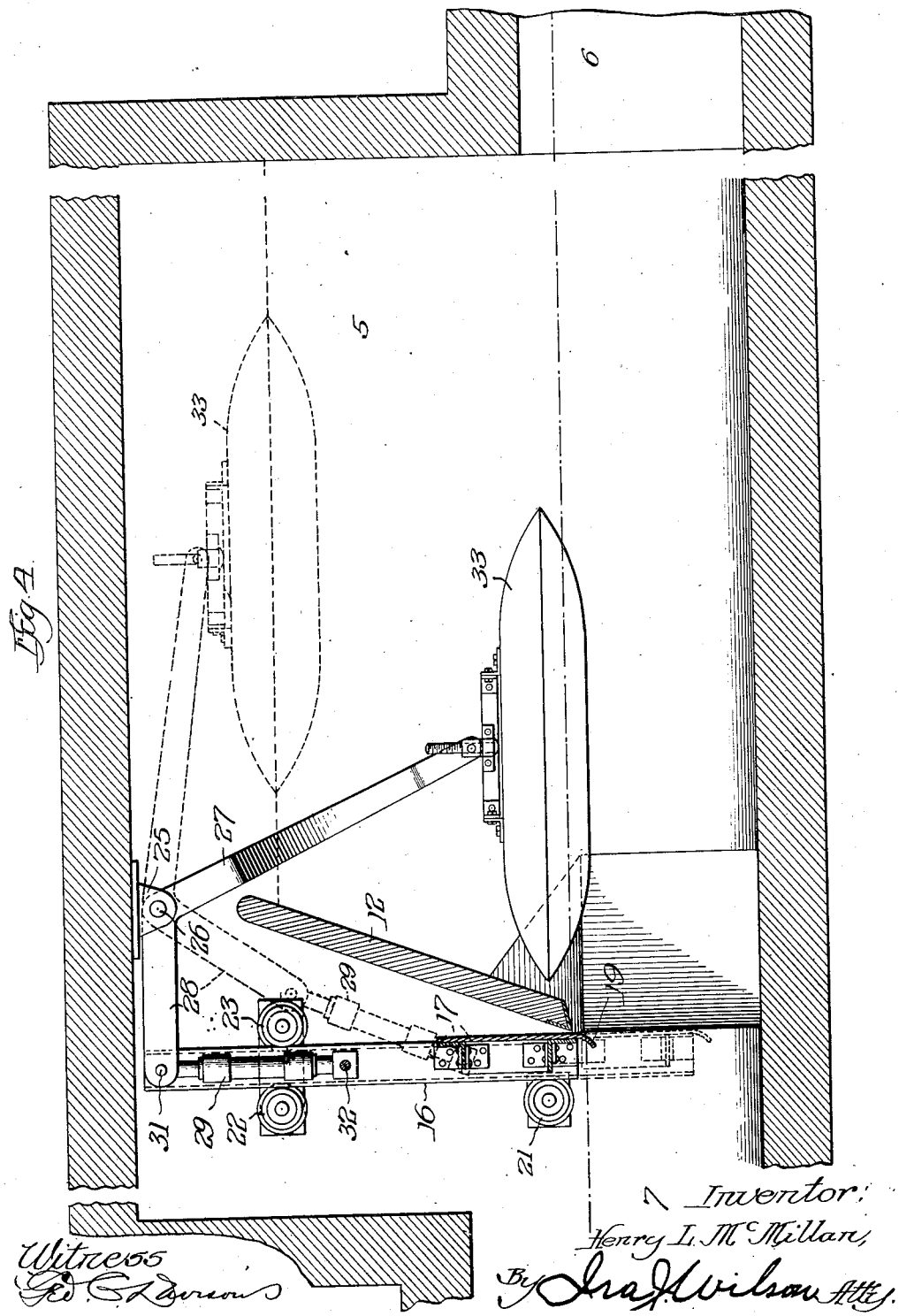

Patented Apr. 7, 1925.

1,532,829

UNITED STATES PATENT OFFICE.

HENRY L. McMILLAN, OF CHICAGO, ILLINOIS.

SEWAGE-FLOW REGULATOR.

Application filed April 29, 1921. Serial No. 465,579.

*To all whom it may concern:*

Be it known that I, HENRY L. MCMILLAN, a citizen of the United States, residing at Chicago, in the county of Cook and State of Illinois, have invented certain new and useful Improvements in Sewage-Flow Regulators, of which the following is a specification.

This invention relates in general to sewage or other hydraulic systems, and has more particular reference to a regulator by which the flow of liquid to a collecting or intercepting conduit is automatically regulated so as to preclude a flow from a main to a collecting conduit in excess of a predetermined maximum volume. As illustrating one adaptation of my invention, I have shown it herein as applied to a sewage system, but it should be understood that it is capable of a variety of uses.

In municipal or other systems of sewers of the combined type, that is, in which both ordinary sewage of domestic and trade wastes and also storm water from streets, roofs, etc., mix in the sewers during storms and flow together towards the sewer outlet, it is common practice to employ a system of intercepting or collecting sewers connected at various convenient points to the main sewers and adapted to intercept the dry weather flow in the main sewer and direct this flow through the collecting sewers to sewage pumping stations or sewage treatment works, or both, as the case may be.

When storms occur, which greatly increase the flow through the main sewers over the ordinary dry weather flow, the increased head in the main sewers, produces an increased flow to the collecting sewers, with the result that this storm flow which is rather dilute in character will, unless provision is made to prevent such result, surcharge the collecting sewers to an extent which will preclude their reception of the more concentrated dry weather flow from an area which may not have been affected by the storm. Consequently, the collecting sewers deliver to the pumping stations or treatment works, a quantity of dilute sewage, while the more concentrated sewage is caused to back up in the main sewer and is delivered from the sewer outlet into the stream or other body of water into which the main sewer delivers and which is not intended to receive large quantities of concentrated sewage, and very unsanitary conditions inevitably result.

Furthermore, without adequate flow regulation between the main and intercepting sewers, the intercepting sewers will be filled to capacity during storms and will consequently deliver a greater flow to the pumping stations or treatment plants than these stations or plants are capable of taking care of.

One of the primary purposes of my present invention is to provide a sewage flow regulator between the main and the intercepting sewers which will automatically regulate and control the flow of sewage from the main to the intercepting sewers so that the intercepting sewers will receive all of the dry weather flow, which they are designed to deliver to the pumping or treatment plants, but when storms occur, the flow from the main to the intercepting sewers will be so regulated that only a predetermined maximum volume of flow will be permitted, thereby insuring that the intercepting sewers will not be surcharged in any storm area so as to preclude their reception of the concentrated sewage from an area not affected by the storm, and also precluding the delivery to the collecting sewers of an aggregate volume in excess of that for which the pumping or treatment plants were designed.

In sewage systems, in which the grades are small so that the normal dry weather flow is comparatively slow, a considerable quantity of refuse and solid matter will tend to deposit and collect along the bottoms of the sewers, but when a rush of water resulting from a storm occurs, these deposits will be quickly stirred up and carried along with the rush of water through the sewers. Since these deposits are of concentrated character, and should be delivered to the collecting sewers and eventually to the pumping stations or treatment plants instead of being permitted to flow to the outlet end of the main sewer, it is desirable that the regulators permit an initial surplus flow from the main to the collecting sewers during a storm period to thereby insure the delivery of much of these deposits into the collecting sewers, and after such delivery has been effected, or the collecting sewer is in danger of being surcharged by the surplus flow, the volume of flow from the main to the collecting sewers should be cut down to prevent surcharging of the collecting sewers.

One of the objects of my invention is to provide a regulator which will automatically take care of the conditions above outlined by permitting an initial surplus discharge into the collecting sewers sufficient to deliver to them much of the deposits and concentrated sewage which accumulates in the sewers during a protracted dry period and thereafter to restrict the volume of flow from the main to the collecting sewers when the level in the collecting sewers reaches a predetermined height so as to thereby prevent overcharging of these collecting sewers.

Another object of this invention is to provide a regulator which will permit an unobstructed and steady flow of dry weather flow and storm mixtures up to the predetermined maximum with no appreciable loss of head other than necessary loss in deflecting the flow from the main sewer into the collecting sewer, except when dealing with very slow velocities of flow, thereby providing a continuous and unobstructed conduit for all flows up to the predetermined maximum. Furthermore, my invention aims to permit a continuous flow which will keep the grit, sediment, etc. moving so that it will not collect and interfere with the movement of the regulator.

Another object of my invention is to provide a flow regulator which will be simple in construction, economical to manufacture, one which will be strong, durable, reliable and efficient in operation, and one which will not be liable to get out of order or become clogged or rendered inoperative by floating or other objects which are carried along by the sewage.

Other objects and many of the attendant advantages of my invention should be readily appreciated by those skilled in the art as the same becomes better understood by reference to the following description when considered in connection with the accompanying drawings.

Referring to the drawings:

Fig. 1 is a longitudinal vertical sectional view through a sewer connection equipped with my invention;

Fig. 2 is a transverse sectional view on the line 2—2 of Fig. 1;

Fig. 3 is a similar view on the line 3—3 of Fig. 1; and

Fig. 4 is an enlarged sectional view similar to Fig. 1 showing a simplified form of my invention.

Referring now to the drawings more in detail, reference character 5 indicates generally a chamber interposed in the connection between a main sewer and an intercepting or collecting sewer. The inlet passage 6 connects with the main sewer which is equipped with the usual dam for diverging normal dry weather flow in the connection, and the delivery passage 7 is connected with a collecting or intercepting sewer 8.

The chamber 5 is constructed of masonry and preferably equipped with manholes 9 and 11 through which access to the interior of the chamber may be had, and also with a sluice gate 10 of suitable construction. That portion of the chamber below the water level of the maximum quantity to be intercepted forms a continuation of and is of no greater cross-sectional area than the inlet opening and that portion above said water level is of suitable dimensions and proportions to accommodate the regulator, the construction of which will now be described.

Referring first to the form of the invention disclosed in Fig. 4, the chamber is provided near its downstream end with a transversely disposed partition or diaphragm 12, preferably disposed at an inclined position as shown, and spaced from the floor of the chamber a distance sufficient to permit the free flow of the maximum desirable sewage flow therebeneath and extending upwardly higher than the maximum storm water level in the main sewer.

Sufficient space should be afforded between the top of the diaphragm and the ceiling of the chamber to accommodate the working parts as will hereafter be apparent.

The side walls of the chamber converge downstream from a point upstream of the diaphragm to a point approximately in vertical alignment with the lower edge of the diaphragm, providing a restricted waterway 13 beneath the diaphragm, as will be apparent from Figs. 2 and 3. These inwardly converging tapered walls 14 and 15 are so shaped that the waterway is trapezoidal in form, its top being wider than its bottom, and their downstream edges are disposed substantially at right angles to the direction of flow through the waterway so that the side margins of the face of the gate 16 are disposed downstream from and behind but closely adjacent to these edges of the walls, thus affording a measure of protection against leakage between the gate and the edges of these walls below the diaphragm. Furthermore, the restricted waterway immediately beneath the gate increases the velocity of flow at this point, thereby permitting the employment of straight line instead of curved walls, and a narrow instead of a wide gate which would otherwise be necessary in cases where velocities are very slow.

The gate is formed from a metal plate 17 suitably reinforced and braced at its downstream side, as indicated at 18, and the lower edge of the gate is preferably rearwardly turned, as indicated at 19 to prevent lodgment of solid matter on this edge and to facilitate the flow control. It will be apparent from Fig. 4 that the upstream face of the gate is disposed closely adjacent to the lower edge of the diaphragm 12, which serves as a partial guide for the gate in its vertical movements, and prevents undue leakage between the diaphragm and the gate. Downstream from the diaphragm there is provided at each side of the chamber, a guide roller 21 which holds the lower portion of the gate against movement downstream and serves as a guide for the gate in its movements. Guide arms 20 project upwardly from each side of the gate between a pair of guide rollers 22 and 23, and it will therefore be apparent that these upper guide rollers, together with the lower rollers 21 and the lower edge of the diaphragm serve to guide the gate with a minimum of friction in its vertical adjusting movements.

Substantially above the upper edge of the diaphragm 12, there is provided a fulcrum bearing or bearings 25, in this instance fixedly attached to the ceiling of the chamber, and in these bearings, there is fulcrumed upon a cross rod or a pair of pins 26, a bell crank lever comprising the long arm 27 extending upstream and the short arm 28 extending downstream. The bell crank lever is preferably bifurcated so that it is fulcrumed at two spaced points upon the rod or pins 26 and provides a pair of arms 28, each of which is connected with the gate 16 near its side edges by a link 29 pivoted to the arms 28 at 31 and to the gate at 32. These links are of turnbuckle construction, affording an adjustable connection between the gate and the bell crank lever by which the vertical position of the gate with respect to the lever may be adjusted and the gate trued to insure against binding or sticking in its movements.

The long arm 27 of the lever is adjustably connected at its outer end to a float 33, which may be of any preferred construction, but preferably, is made of hollow steel and of such weight that it will float about one-half submerged in the chamber on the upstream side of the diaphragm. This float is sufficiently heavy to counterbalance, through the bell crank lever, the gate 16, and as the float lowers with decrease in head of the water in the chamber, the gate will be lifted by the float until at low water level, the float will assume the lowered position and the gate the upper position shown in full lines in Fig. 4.

In the event of storm, the increased flow from the main sewer into the chamber 5 will cause a rise of water in the chamber on the upstream side of the diaphragm 12 since the lower edge of the gate is disposed at a lower level than the top of the deflecting dam in the main sewer. When the inlet passage is delivering into the chamber at capacity, a predetermined volume of sewage will flow through the waterway 13 beneath the elevated gate, and as the water rises in the chamber, this flow would increase as the result of the increased head provided the waterway beneath the gate remained of undiminished size. As the head rises, however, in the chamber, the float 33 will be carried upwardly, thus causing the gate to be lowered and the proportions between the arms 27 and 28 of the bell crank in conjunction with the toggle action between the arms 28 and the links 29 will so proportionately diminish the area of the waterway by the lowering of the gate that a predetermined inverse ratio between the velocity resulting from the increased water head in the chamber and the size of the waterway will be maintained, which will at all times preclude more than the predetermined maximum volume flow beneath the gate. This maximum volume flow is so calculated that overloading of the collecting sewer is prevented, and the surplus storm water therefore, instead of being permitted to surcharge the collecting sewers, is restrained and caused to continue through the main sewer from which it is discharged at the delivery end of this sewer without overloading the collecting sewer or the pumping or sewage treatment plants to which the collecting sewers deliver.

The low water position of the float and the gate is shown in full lines in Fig. 4, from which it will be observed that the gate will remain at its fully open position, permitting the unrestricted normal dry weather flow through the waterway, and this position will be maintained until as the result of a storm or for other reasons the water level in the chamber rises, to produce the maximum desirable volume flow beneath the gate. After this point has been reached, the further rising of the water level will elevate the float which, through the compensating bell crank lever and the toggle connection between the lever and the gate causes the gate to be lowered. The restriction of the waterway resulting from the lowering of the gate however, will not be directly proportional to the rising movement of the float, but will be such that the area of the waterway will change in ratio inverse to that in which the rise in water head in the chamber would increase the volume of flow through a waterway of fixed area. The lowering movement of the gate therefore, is so related to the rise in head in the chamber that the volume flow through the waterway beneath the gate will not be permitted to exceed a maximum desired predetermined flow irrespective of the water level in the chamber. Consequently, the flow from the main sewer to the collecting sewer is efficiently and accurately controlled so as to deliver only a predetermined quantity of water flow to the collecting sewer, thus insuring against overloading of the collecting sewer and the pumping or treatment plants.

Since as previously stated, in sewer systems where the grade is slight and the normal dry weather sewage flow is consequently at slow speeds, a considerable quantity of solid matter and deposits will collect upon the floors of the sewers during protracted dry weather periods, which deposits or accumulations will be stirred up and moved through the sewers by the initial flush of excess water resulting from a storm or the like, it is desirable that these deposits be delivered to the collecting sewers instead of being caused to continue to the outlet end of the main sewers. With this end in view, I have devised an auxiliary control for my improved regulator, which will retard the controlling action of the regulator until much of this initial flush of concentrated sewage and accumulated deposits has been delivered to the collecting sewer, whereupon the regulator will be brought into operation to restrict and control the flow to the collecting sewer, as previously described, thereby preventing overloading of the collecting sewer.

This auxiliary control is illustrated in Figs. 1 to 3 inclusive, by reference to which it will be observed that the bell crank lever fulcrum bearing, instead of being mounted directly on the ceiling of the chamber, as shown in Fig. 4, is carried by a bifurcated lever 34 fulcrumed at one end in bearings 35 fixed to the ceiling of the chamber. Intermediate its ends, this lever is equipped with depending ears 36 to which the bifurcated bell crank lever 27 is fulcrumed upon pins 37, and the downstream end of the lever 34 is connected through a link 38 to a piston 39 disposed within a cylinder 41 mounted in any convenient manner, such for instance as upon a ledge 42 of the chamber, (shown in Fig. 1). The piston 39 is adapted to be hydraulically operated, and the upper end of the cylinder is accordingly connected by a pipe 43 with a four-way cock 44, the lower end of the cylinder being similarly connected to the valve by a pipe 45. A water supply pipe 46 connected to the city main or any suitable source of water supply under pressure, delivers water under pressure to the four-way cock, which is controlled by a float 47 disposed in the collecting sewer 8 so as to deliver water either above or below the piston 39 through the pipes 43 or 45, depending upon the height of the sewage level in the collecting sewer. Preferably the float 47 is adjustably connected to the cock 44 in order that the valve may be actuated at different water levels in the collecting sewer, thus affording a range of adjustment to meet various conditions or requirements.

Normally, the dry weather flow does not fill the collecting sewer anywhere near to capacity, and the float 47 will assume the position shown in dotted lines in Fig. 1, thereby positioning the cock 44 so that the water pressure will be delivered from pipe 46 through pipe 45 to the under-side of the piston 39, thereby holding the lever 34 in the elevated position shown in dotted lines in Fig. 1, with the gate 16 elevated to its maximum height and the float 33 in lowered position, the ceiling of the chamber 5 being in this instance somewhat higher than the chamber illustrated in Fig. 4. The gate in its upper position will permit a flow beneath it somewhat in excess of the normal desired maximum. At the beginning of a storm therefore, the initial flush of excess water through the sewers which will carry with it the concentrates and deposits previously mentioned, will be permitted to flow beneath the gate to the collecting sewer. As the water level in the chamber rises, the gate will be lowered by the float 33, but by reason of the elevated position of the bell crank lever fulcrum, the flow beneath the gate is still greater than the desired normal maximum so that adequate provision is afforded for the delivery to the collecting sewer of much of the accumulated deposits and the concentrated sewage before the flow is restricted to the desired normal maximum. This restriction takes place when the fluid level in the collecting sewer 8 has reached a predetermined maximum, for which the float 47 has been set, and when this level is reached, the float 47 will be raised to the full line position shown in Fig. 1, thus cutting off the water supply through the pipe 45 and admitting water above the piston 39 through the pipe 43. The cock 44 may be so constructed that when the water supply to the pipe 45 is shut off, this pipe may drain back through the cock, and similarly, when the water supply to the pipe 43 is cut off, this pipe may drain back through the cock. Therefore, with hydraulic pressures exerted upon the upper face of the piston, this piston will be depressed into the full line position shown in Fig. 1, thus lowering the lever 34 to move the bell crank lever fulcrum downwardly, with the result that the gate will be lowered and will be subjected to the complete normal control of the float 33, thereby restricting the flow through the waterway beneath the gate to the predetermined desired normal maximum.

When the storm has passed and the level in the collecting sewer has receded, the float 47 will again lower, thereby causing the piston to be elevated and restoring the parts to their normal position, where they will remain during dry weather flow but upon the next storm, will be automatically brought into operation to restrict the flow to the collecting sewer after the initial excess flush of storm water has been permitted to carry the accumulated deposits into the collecting sewer.

It is believed that the construction, mode of operation, and many of the attendant advantages of my invention will be readily appreciated and understood without further description, and while I have shown and described preferred embodiments thereof, it should be manifest that the details of construction and the size, shape, arrangement and proportion of the various parts may be varied within wide limits without departing from the essence of the invention as defined in the following claims.

I claim:

1. In a flow regulator, the combination of a chamber, a control gate therein, a float in said chamber, a bell crank lever fulcrumed in said chamber, the long arm of said lever being connected with said float, and a toggle connection between the short end of said lever and said gate, said bell crank lever and said toggle connection being proportioned to close the gate upon rising movements of the float inversely proportional to the increased flow through a fixed opening resulting from an increased water head.

2. In a flow regulator, the combination of a chamber, a transversely disposed diaphragm therein, a vertically movable gate, a float on the upstream side of said diaphragm, a bell crank lever, an adjustable connection between said lever and said float, and an adjustable connection between said lever and said gate so proportioned and arranged that equal successive movements of the float will produce variable successive movements of said gate.

3. In a flow regulator, the combination of a chamber, a transverse diaphragm therein, a restricted waterway beneath said diaphragm, a vertically movable gate adapted to control said waterway, a float on the upstream side of said diaphragm, a bell crank lever, an adjustable connection between said lever and said float, and an adjustable toggle connection between said lever and said gate whereby the gate is moved variable amounts by movement of the float through equal vertical distances.

4. In a flow regulator, the combination of a chamber, a diaphragm therein, a vertically movable gate, a float, operative connections between said gate and said float including a bell crank lever, and means for adjusting the position of the fulcrum of said lever.

5. In a flow regulator, the combination of a chamber, a diaphragm therein, a vertically movable gate, means on the upstream side of said diaphragm for controlling the position of said gate, and auxiliary means on the downstream side of said diaphragm for controlling the position of said gate.

6. In a sewage flow regulator, the combination of a chamber connecting a main and a collecting sewer, a control gate in said chamber, means controlled by the liquid level in said chamber on the upstream side of said gate for regulating the position of said gate, and auxiliary means controlled by the liquid level in said collecting sewer for further regulating the position of said gate.

7. In a sewage flow regulator, the combination of a chamber connecting a main and a collecting sewer, a control gate in said chamber, a float on the upstream side of said gate, operative connections between said float and said gate including a bell crank lever whereby said gate is controlled from said float, and means controlled by the liquid level in said collecting sewer for adjusting the position of the fulcrum of said bell crank lever.

8. In a flow regulator, the combination of a diaphragm provided with a substantially trapezoidal shaped waterway, a vertically movable gate adapted to vary the effective area of said waterway, a float, and an operative connection between said float and said gate, including a bell crank lever and a toggle whereby the effective area of said waterway is decreased as the float rises and vice versa.

9. In a flow regulator, the combination of a diaphragm provided with a waterway, the walls of which waterway converge from top to bottom and from a point upstream to the delivery end of said waterway, a vertically movable gate disposed at the downstream end of said waterway, a float, and means including a bell crank lever connecting said float and gate whereby the gate is moved to vary the effective area of said waterway inversely with relation to the movements of said float.

10. In a flow regulator, the combination of a diaphragm provided with a waterway, a vertically movable gate for controlling the effective area of said waterway, a float, operative connections between said float and said gate, said connections including a fulcrumed lever, and means for automatically adjusting the position of the fulcrum of said lever.

HENRY L. McMILLAN.